United States Patent
Tca et al.

(10) Patent No.: US 12,182,111 B1
(45) Date of Patent: Dec. 31, 2024

(54) DYNAMIC QUERY RECOMMENDER

(71) Applicant: Sumo Logic, Inc., Redwood City, CA (US)

(72) Inventors: Bashyam Tca, Walnut Creek, CA (US); David M. Andrzejewski, San Francisco, CA (US); Tejaswi Redkar, San Ramon, CA (US); Aaishwarya Bansal, Waterloo (CA); Rohith Kumar Poshala, Milpitas, CA (US); Michael J. Haskell, San Jose, CA (US); Ayan Ghatak, Kolkata (IN)

(73) Assignee: Sumo Logic, Inc., Redwood City, CA (US)

( * ) Notice: Subject to any disclaimer, the term of this patent is extended or adjusted under 35 U.S.C. 154(b) by 0 days.

(21) Appl. No.: 18/241,487

(22) Filed: Sep. 1, 2023

(51) Int. Cl.
 *G06F 16/24* (2019.01)
 *G06F 11/07* (2006.01)
 *G06F 16/242* (2019.01)

(52) U.S. Cl.
 CPC ........ *G06F 16/243* (2019.01); *G06F 11/0787* (2013.01); *G06F 16/2445* (2019.01)

(58) Field of Classification Search
 CPC ............... G06F 16/243; G06F 11/0787; G06F 16/2445
 USPC ....................................................... 707/759
 See application file for complete search history.

(56) References Cited

U.S. PATENT DOCUMENTS

| | | | | |
|---|---|---|---|---|
| 7,840,538 B2 * | 11/2010 | Joshi | ...................... | G06F 16/332 707/672 |
| 8,874,550 B1 * | 10/2014 | Soubramanien | ........ | G06F 21/00 707/731 |
| 10,546,336 B2 * | 1/2020 | Kasai | ................... | G06F 16/3323 |
| 11,288,319 B1 * | 3/2022 | Das | ........................ | G06F 40/186 |
| 2005/0149496 A1 * | 7/2005 | Mukherjee | ........ | G06F 16/24575 |
| 2007/0294251 A1 * | 12/2007 | Vadai | ..................... | G06F 16/337 707/999.102 |
| 2008/0071740 A1 * | 3/2008 | Jhala | .................... | G06F 16/3322 |
| 2008/0294630 A1 * | 11/2008 | Yan | ..................... | G06Q 30/0256 707/999.005 |
| 2009/0119259 A1 * | 5/2009 | Williams | ............. | G06F 16/9535 |
| 2009/0248626 A1 * | 10/2009 | Miller | ................... | G06F 16/954 |
| 2010/0281029 A1 * | 11/2010 | Parikh | ................ | G06Q 30/0631 707/769 |

(Continued)

*Primary Examiner* — Hicham Skhoun
(74) *Attorney, Agent, or Firm* — Schwegman Lundberg & Woessner, P.A.

(57) ABSTRACT

Techniques are presented for recommending queries to search log information. The system provides useful insights and recommendations based on user needs and queries by utilizing the user context, with information about the user activities (e.g., recent alerts) and the user configuration in the system (e.g., applications configured by the user), to provide recommendations. There may not be enough context for a new user to provide good recommendations, so the system determines the context based on the activities of other users, such as more experienced users or users investigating the same type of problem. Based on the context, the user recommends natural language queries (NLQ) or system queries to accelerate the search process and assist the user during an investigation. Further, NLQs may be converted to complex search queries that use the search query language, and the NLQs may also be used as part of the context for the subsequent recommendations.

17 Claims, 13 Drawing Sheets

(56) References Cited

U.S. PATENT DOCUMENTS

| | | | | |
|---|---|---|---|---|
| 2011/0184951 | A1* | 7/2011 | Paparizos | G06F 16/951 |
| | | | | 707/E17.089 |
| 2012/0096030 | A1* | 4/2012 | Kim | G06F 16/3349 |
| | | | | 707/E17.014 |
| 2012/0203772 | A1* | 8/2012 | Cucerzan | G06F 16/3338 |
| | | | | 707/723 |
| 2015/0193538 | A1* | 7/2015 | Maddison | G06F 16/70 |
| | | | | 707/706 |
| 2019/0146978 | A1* | 5/2019 | Beedgen | G06F 16/2228 |
| | | | | 707/754 |
| 2021/0374153 | A1* | 12/2021 | Saxena | G06F 16/24553 |
| 2022/0107802 | A1* | 4/2022 | Rao | G06F 16/907 |
| 2023/0394040 | A1* | 12/2023 | Gupta | G06F 16/285 |
| 2023/0394045 | A1* | 12/2023 | Nixon | G06F 16/248 |

* cited by examiner

```
 1  sourceCategory="stream"
 2  StructuredLogsSl:Reporter
 3  | parse "SLI failure condition *" as json
 4  | json auto
 5  | where component="no search failures"
 6  | format('%016X', int(customer)) as customerHex
 7  | lookup org_type_simple, org_email from /shared/customers on org.id=customerHex
 8  | where !(org_email contains "peaksum.com") and org_type_simple = "paid"
 9  | count_distinct(customer) as org_count
10  | where org_count >= 10
11
```

302

304

[SHOW QUERIES RELATED TO THE GIVEN S...] [PODS WITH LOCK ACQUISITION TROUBLE] ← 306

RELATED SEARCHES

[SHOW QUERIES RELATED TO THE GIVEN S...] ← 308

QUERIES FROM THE LOG BASED PANELS IN DASHBOARD [ERROR LOG LINES PER POD] [PODS WITH LOCK RELEASE TROUBLE] [SLOW EXTRACTION RULES] ← 310

[PODS WITH LOCK ACQUISITION TROUBLE]

DYNAMIC QUERY RECOMMENDER

TECHNICAL FIELD

The subject matter disclosed herein generally relates to methods, systems, and machine-readable storage media for recommending search queries for searching log data.

BACKGROUND

On-call engineers are tasked with troubleshooting issues in production environments and finding solutions to recover from malfunctions quickly, having to investigate issues and identify their root causes, which requires deep knowledge about production systems, troubleshooting tools, and diagnosis experience.

Problems are often detected when alerts are triggered by the monitoring systems that inform about problems with computers, services, or applications associated with the company products and services. Typically, alarms are generated when the value of a metric goes above or below threshold values (e.g., CPU utilization, amount of memory available).

However, troubleshooting often requires expertise, such as knowing what kind of queries are available to diagnose and what data to examine. This lack of expertise presents difficulties, especially for new users since they do not have the expertise from previous resolutions of problems.

BRIEF DESCRIPTION OF THE DRAWINGS

Various of the appended drawings merely illustrate example embodiments of the present disclosure and cannot be considered as limiting its scope.

FIG. 3 is a UI of a log-search tool that includes the selected query, according to some example embodiments.

FIG. 4 shows results from a log search, according to some example embodiments.

DETAILED DESCRIPTION

Figure 1:
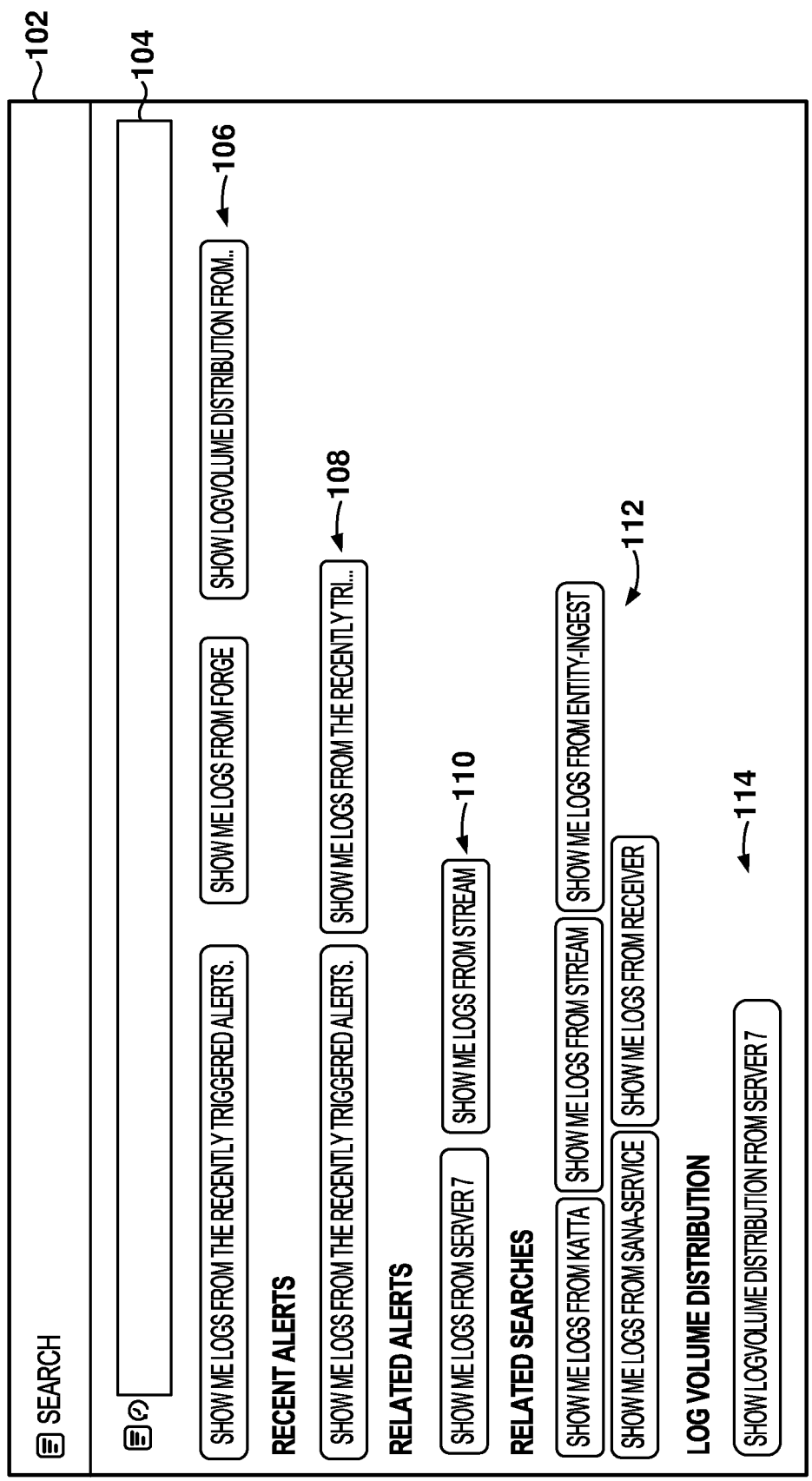
FIG. 1 shows a user interface (UI) for searching logs, according to some example embodiments.

Example methods, systems, and computer programs are directed to recommending a query to search log information. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The disclosed embodiments relate to a system and method for enhancing user interaction with a software platform, specifically in the context of a log analysis tool. The system aims to provide users with useful insights and recommendations based on their specific needs and queries. The system may use the context of the user, which includes information about the user activities (e.g., recent alerts) and the user configuration in the system (e.g., applications configured by the user in the system) to provide recommendations for searches.

When a user is new to the system, there may not be enough information (e.g., enough "context") to provide good recommendations. In this case, the system determines the context based on the activities of other users, such as more experienced users that are from the same company, or even expand to other users of the system, even if they are from different companies, based on the type of problem (e.g., alert) being troubleshot.

The system utilizes a combination of techniques, including suggested searches, autocomplete functionality, and natural language processing, to assist users in formulating queries and finding relevant information. The autocomplete feature suggests potential queries and analyses based on the user's input, leveraging existing data sets, dashboards, and saved searches within the platform. This helps users quickly find the information they need without having to manually construct complex queries.

In one aspect, the system employs a natural language processing model, e.g., a fine-tuned transformer model, to convert user input expressed in natural language into executable queries. This model is trained on a dataset consisting of pairs of natural language expressions and corresponding queries.

The system also considers the user's past interactions, including their search history, saved dashboards, and alerts, to personalize the recommendations and provide more relevant insights. Additionally, the system leverages metadata, such as source categories used as log metadata, to further refine the recommendations and provide a more tailored user experience.

The disclosed system and method offer several advantages, including improved user productivity, enhanced data exploration capabilities, and increased efficiency in finding valuable insights from large volumes of log data. By leveraging the autocomplete functionality, natural language processing, and personalized recommendations, the system aims to simplify the user experience and enable users to quickly and effectively analyze log data.

One general aspect includes a computer-implemented method that includes an operation for causing presentation of a user interface (UI) on a device of a user, the UI providing options for searching log data stored by an online service. The method further includes identifying a plurality of search queries based on the user and one or more alerts generated by the online service. Identifying the plurality of search queries comprises identifying an alert triggered within a predetermined time period, determining a source category in the alert, the source category being a user-customizable metadata tag stored with the log data, and identifying the plurality of search queries based on the source category. The method further includes an operation for presenting the plurality of search queries on the UI as selectable options for searching the log data.

FIG. 1 shows a user interface (UI) 102 for searching logs, according to some example embodiments. In some embodiments, recommendations on search queries are provided to the user based on the situation of the user. For example, as the user selects different searches, additional more-detailed, related search queries are presented.

The suggestions are particularly helpful for users who are new to the system, and one objective is to promptly provide these users with valuable insights. Another goal is to let users interact with the system using natural language, without having to create complex queries to sort the data.

In one embodiment, suggestions are provided based on the input provided, for a query to search logs. In another embodiment, search queries are suggested as the user enters text in the search field. Further, in another embodiment, queries are generated based on the user input and knowledge about the user and other users of the same company.

In the illustrated example, the user is investigating an alert. The UI 102 provides a search field 104 and a plurality of natural-language search queries that include common search queries 106 (e.g., "Show me logs from recently triggered alerts"), recent-alert queries 108 (e.g., "Show me logs from recently triggered alerts"), related-alert queries 110 (e.g., "Show me logs from server 7"), related-search queries 112 (e.g., "Show me logs from stream"), and log-volume-distribution query 114 (e.g., "Show logVolume distribution from server 7"). It is noted that the embodiment illustrated in FIG. 1 is an example and does not describe every possible embodiment. The embodiment illustrated in FIG. 1, should therefore not be interpreted to be exclusive or limiting, but rather illustrative.

For example, the user may be investigating a transmission of cloud trail logs to the system. The system analyzes these logs and identifies something of interest or something unusual within these logs. These findings are then presented as results to the user, even without a specific request from them. If the user is not satisfied with the presented results, they have the option to request other insights from the system in plain English based on related search queries. The system analyzes many factors, as described in more detail below, such as queries submitted by the user in the past, queries submitted by other users in the past in a similar scenario, queries suggested by the system based on recent log activity, etc. The system then generates query suggestions to allow the user to navigate by using more and more specific search queries to identify the most relevant data to diagnose the problem.

Figure 2:
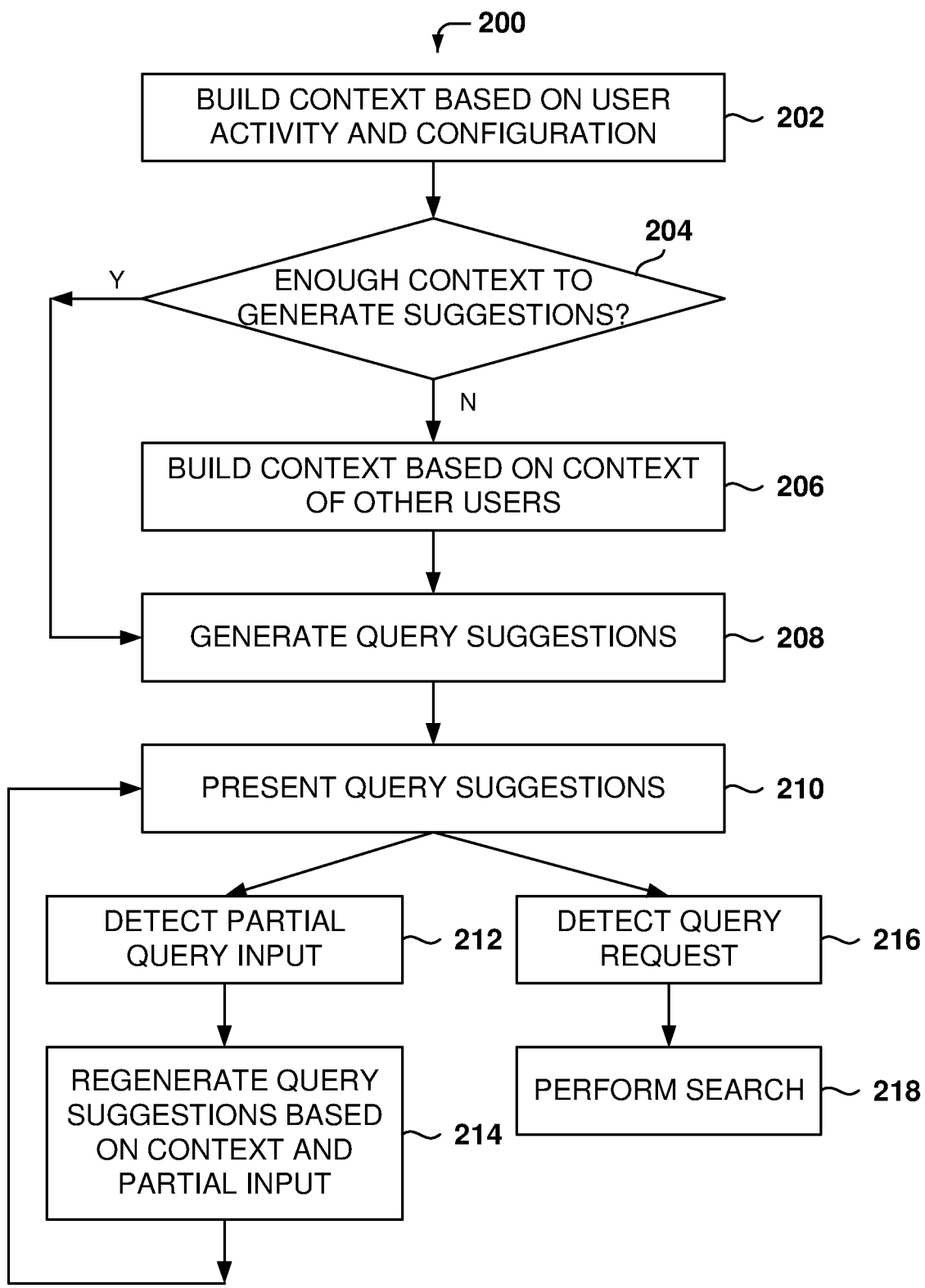
FIG. 2 is a flowchart of a method for providing search assistance based on user's context, according to some example embodiments.

FIG. 2 is a flowchart of a method 200 for providing search assistance based on user's context, according to some example embodiments. The purpose is to make it easier for the user to search and troubleshoot problems. The system may use the context of the user, which includes information about the user activities (e.g., recent alerts) and the user configuration in the system (e.g., applications configured by the user in the system) to provide recommendations for searches.

When a user is new to the system, there may not be enough information (e.g., enough "context") to provide good recommendations. In this case, the system determines the context based on activities of other users, such as more experienced users that are from the same company, or even expand to other users of the system, even if they are from different companies, based on the type of problem (e.g., alert) being troubleshot. The system always protects the privacy of other user's (e.g., never using Personal Identifiable Information (PII) data).

At operation 202, the system determines the context of the user accessing the search UI based on activities of the user and the configuration of the user. The activities of the user include information about actions of the user within a predetermined time period (e.g., last 24 hours, last 48 hours, last week, last month) and includes searches requested by the user, alerts investigated by the user, logs accessed by the user, etc.

The configuration of the user includes any information configured by the user in the service, such as add-ins applications used by the user in the service, search queries created by the user, search queries accessed by the user, configured alerts that will notify the user when a problem is detected, etc. Additionally, information that may be used to build the user context is the information the system has about the topology, architecture, and organization of the user application, e.g., configured services that are related to each other. For example, if a userManagement service depends on another service billingAccounts for billing (e.g., to determine if a user account is in good standing for invoices), a user investigating problems with userManagement might be interested in query recommendations about anomalous behavior or error spikes in the billingAccounts service due to the services dependency relationship.

From operation 202, the method 200 flows to operation 204 where a check is made to determine if there is enough context (e.g., enough information) to provide recommendations for the user. For example, if the user is new to the system, there may not be information on past activities to guess what they user may be searching for. If there is enough information in the context, the method 200 flows to operation 208, and when there is not enough context information, the method 200 flows to operation 206.

At operation 206, the system has determined that there is not context for the user, so the user builds a context based on other users of the system. For example, the system looks at other users in the same company of the user to build a context by identifying what kind of searches other users tend to request, responds from other users to alerts that are similar to a recently-received alert, etc. The system may also include the context activities from other users of the system (in the same company for a different company) that are performed when investigating a certain type of event (e.g., denial of service attack).

From operation 206, the method 200 flows to operation 208 where query suggestions are generated based on the context information previously identified.

From operation 208, the method 200 flows to operation 210 where the suggestions are presented on a UI of the user. The suggestions may be classified into different categories (e.g., recent alerts, related alerts, related searches, log volume distribution).

From operation 210, the method 200 flows to operation 212 when a partial input of the user is detected in the UI (e.g., the user starts typing a request in natural language. However, when the system detects that the user has submitted a search query, then the method 200 flows to operation 216.

At operation 214, the query suggestions are re-generated based on the input entered by the user and the context, and then the method 200 flows back to operation 210.

At operation 216, the query request is detected and the method 200 flows to operation 218 where the search is performed, and the results presented on the UI.

FIG. 3 is a UI 302 of a log-search tool that includes the selected query, according to some example embodiments. In this example, the UI 302 is presented after the user selects the query "Show me logs from recently triggered alerts." The UI 302 includes query 304, natural-language queries 306, related natural-language queries 308, and natural-language queries 310 from the log-based panels in the dashboard.

The query 304 is a complex query with multiple instructions, and this type of query is usually generated by an expert. On the other hand, the natural-language queries are descriptive queries in plain language and can be used by expert users as well as novice users.

The search query language is a tool for searching and analyzing log data that uses a variety of operators to perform searches, such as:

Keyword: operator to search for a specific keyword or phrase in the log data. For example, a query with the keyword of "error" will search for all log messages that contain the word "error";

Operators: the operators are used to combine keywords and phrases to create more complex searches. Some common operators are AND (all of the keywords or phrases must be present in the log message, e.g., a query of "error AND 404" will search for all log messages that contain the words "error" and "404"), OR (either of the keywords or phrases can be present in the log message, e.g., "error OR 404" search for log messages that contain the words "error" or "404"), and NOT (the keyword or phrase cannot be present in the log message for the search to return a result, e.g., "NOT error" would search for log messages that do not contain the word "error"):

Parse: the operator is used to extract data from the log messages. For example, the query (parse "source_ip=\d {1,3} \. \d {1,3} \. \d {1,3} \. \d {1,3}" as source_ip) will extract the source IP address from all log messages and store the source IP address in a new field called source_ip;

Group: the | operator is used to group the results of a search by a common field, e.g., (source_ip|count) will group the results of the search by the source_ip and count the number of messages in each group; and Top: the top operator is used to return the top N results of a search, e.g., (source_ip|top 10) will return the top 10 results of the search.

If the user selects the query 304, then the query will be executed to search the data. Embodiments are presented with reference to queries from company Sumo Logic®, but the same principles may be used to other types of queries and other types of tools.

Figure 4:
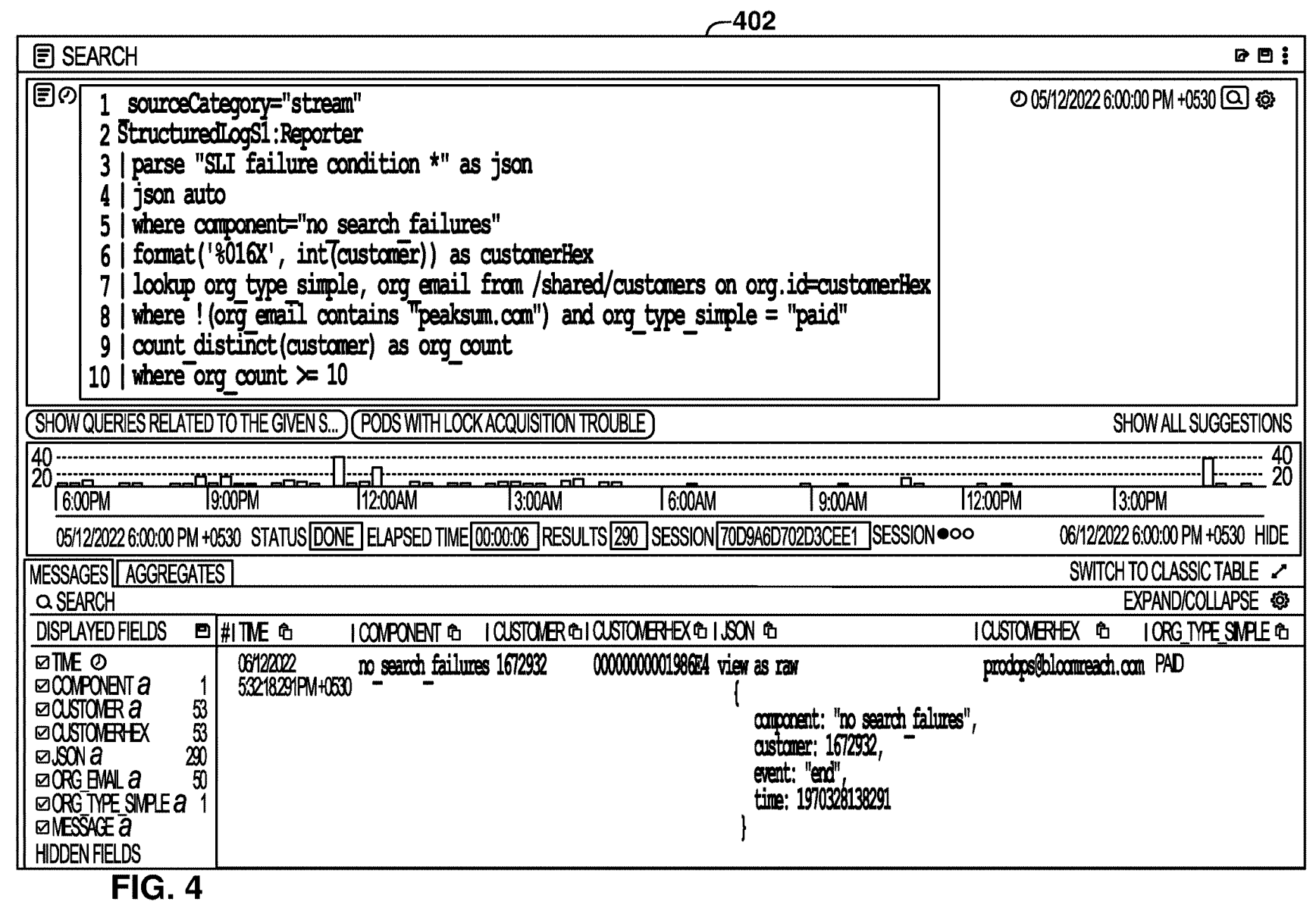

FIG. 4 shows results from a log search, according to some example embodiments. After the user selects the option to execute the query of FIG. 3, the UI 402 is presented, which includes the query that was executed and the results of running the query, such as a histogram of relevant events, and a table with the logs found by executing the query.

Figure 5:
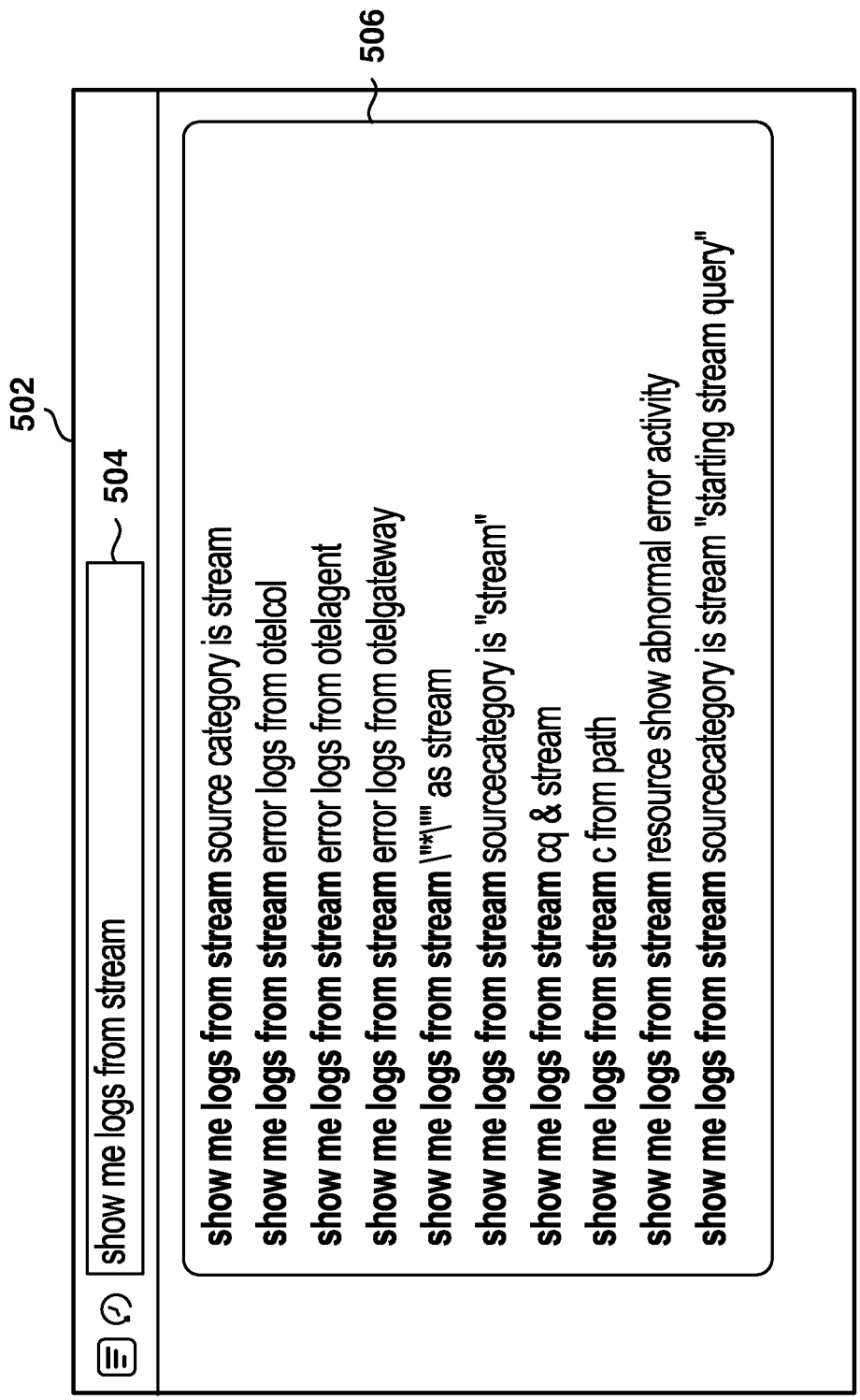
FIG. 5 shows the autocomplete feature while entering a search for logs, according to some example embodiments.

FIG. 5 shows the autocomplete feature while entering a search for logs, according to some example embodiments. In the UI 102 of FIG. 1, the user has selected the natural-language query "Show me logs from stream" in the related-search queries 112. In response, the system presents UI 502 with search field 504 including the beginning of the recommended query, e.g., "Show me logs from stream."

The UI 502 further a list of autocomplete suggestions 506 with recommendations of some of the possible search queries, e.g., "Show me logs from stream sourcecategory is stream," "Show me logs from stream error logs from otelcol," "Show me logs from stream error logs from otelagent," etc.

The user may continue typing in the search field 504 or select one of the queries in list of autocomplete suggestions 506. In this example, the user adds to the search field 504 "where callermodule," and the search field 504 is now "Show me logs from stream where callermodule."

In response, the list of autocomplete suggestions 506 is updated with the following options:

Show me logs from stream where callermodule is "report";

Show me logs from stream where callermodule is not "optimizeit";

Show me logs from stream where callermodule is *;

Show me logs from stream where callermodule matches" ";

Show me logs from stream where callermodule is "api";

Show me logs from stream where callermodule error logs from otelcol;

Show me logs from stream where callermodule error logs from otelagent;

Show me logs from stream where callermodule error logs from otelgateway; and

Show me logs from stream where callermodule is "subquery".

Again, the user may continue typing or select one of the options in list of autocomplete suggestions 506. The process may continue until the user submits the query or one of the options is selected. In response, the system will perform the requested query and present the results of the query, e.g., the results page of FIG. 4 or FIG. 7.

Thus, the system provides a versatile search query entry with autocomplete that is based in natural language without the requirement that the user is an expert in the logic query language (e.g., Sumo logic query language).

Further, the suggestions presented may be based on recently triggered alerts that are relevant to this user entering the search query, as well as information that similar users (e.g., users working for the same company) have accessed in the past or are currently accessing.

Figure 6:
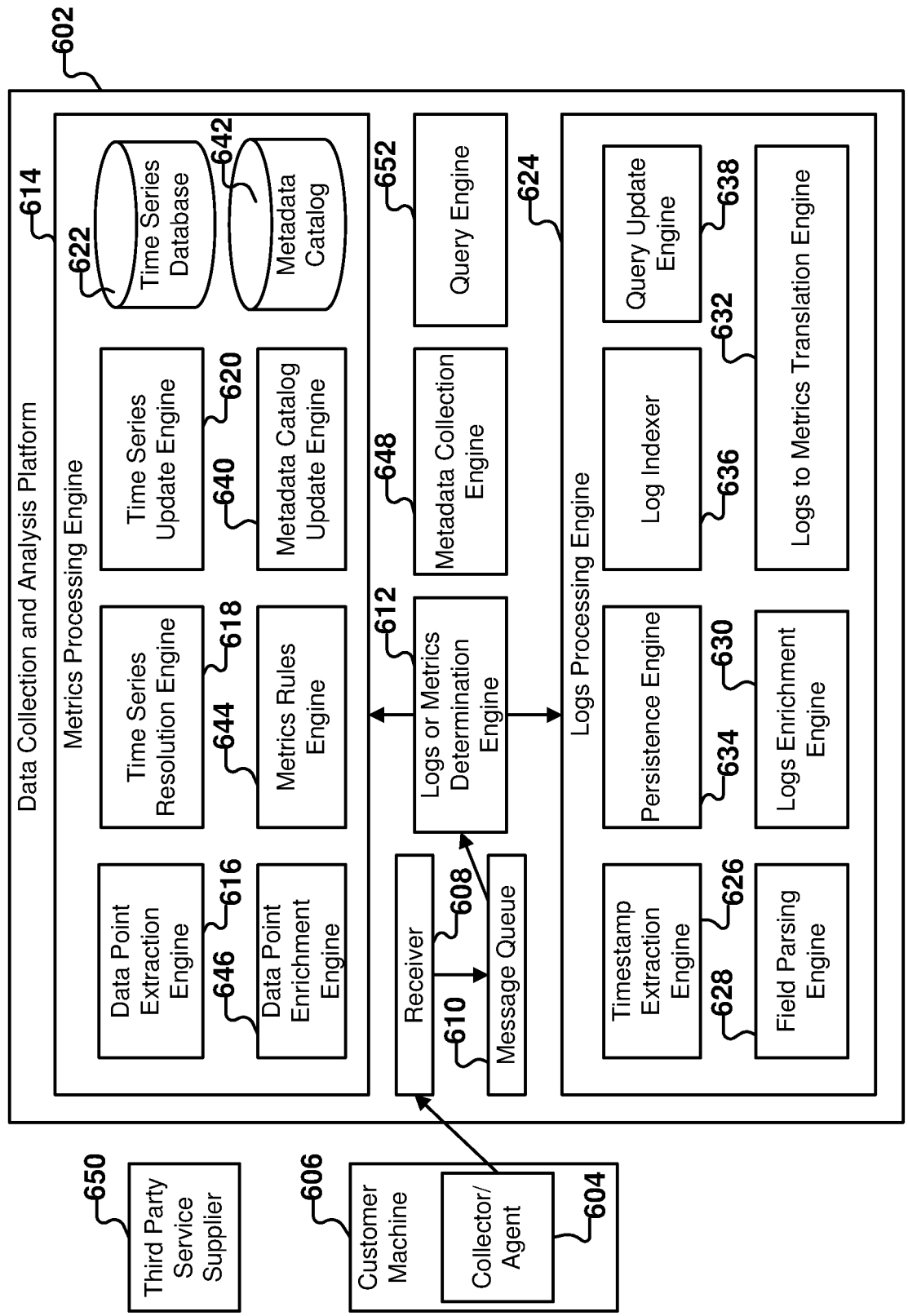
FIG. 6 illustrates an embodiment of an environment in which machine data collection and analysis is performed.

FIG. 6 illustrates an embodiment of an environment in which machine data collection and analysis is performed. In this example, data collection and analysis platform 602 (also referred to herein as the "platform" or the "system") is configured to ingest and analyze machine data (e.g., log messages and metrics) collected from customers (e.g., entities utilizing the services provided by the data collection and analysis platform 602). For example, collectors (e.g., collector/agent 604 installed on machine 606 of a customer) send log messages to the platform over a network (such as the Internet, a local network, or any other type of network, as appropriate): customers may also send logs directly to an endpoint such as a common HTTPS endpoint. Collectors can also send metrics, and likewise, metrics can be sent in common formats to the HTTPS endpoint directly. In some embodiments, metrics rules engine 644 is a processing stage (that may be user guided) that can change existing metadata or synthesize new metadata for each incoming data point.

As used herein, log messages and metrics are but two examples of machine data that may be ingested and analyzed by the data collection and analysis platform 602 using the techniques described herein. Collector/Agent 604 may also be configured to interrogate machine 606 directly to gather various host metrics such as CPU (central processing unit) usage, memory utilization, etc.

Machine data, such as log data and metrics, are received by receiver 608, which, in one example, is implemented as a service receiver cluster. Logs are accumulated by each receiver into bigger batches before being sent to message queue 610. In some embodiments, the same batching mechanism applies to incoming metrics data points as well.

The batches of logs and metrics data points are sent from the message queue to logs or metrics determination engine 612. Logs or metrics determination engine 612 is configured to read batches of items from the message queue and determine whether the next batch of items read from the message queue is a batch of metrics data points or whether the next batch of items read from the message queue is a batch of log messages. For example, the determination of what machine data is log messages or metrics data points is based on the format and metadata of the machine data that is received.

In some embodiments, a metadata index (stored, for example, as metadata catalog 642 of platform 602) is also updated to allow flexible discovery of time series based on their metadata. In some embodiments, the metadata index is a persistent data structure that maps metadata values for keys to a set of time series identified by that value of the metadata key.

For a collector, there may be different types of sources from which raw machine data is collected. The type of source may be used to determine whether the machine data is logs or metrics. Depending on whether a batch of machine data includes log messages or metrics data points, the batch of machine data will be sent to one of two specialized backends, metrics processing engine 614 and logs processing engine 624, which are optimized for processing log messages and metrics data points, respectively.

When the batch of items read from the message queue is a batch of metrics data points, the batch of items is passed downstream to metrics processing engine 614. Metrics processing engine 614 is configured to process metrics data points, including extracting and generating the data points from the received batch of metrics data points (e.g., using data point extraction engine 616). Time series resolution engine 618 is configured to resolve the time series for each data point given data point metadata (e.g., metric name, identifying dimensions). Time series update engine 620 is configured to add the data points to the time series (stored in this example in time series database 622) in a persistent fashion.

If logs or metrics determination engine 612 determines that the batch of items read from the message queue is a batch of log messages, the batch of log messages is passed to logs processing engine 624. Logs processing engine 624 is configured to apply log-specific processing, including timestamp extraction (e.g., using timestamp extraction engine 626) and field parsing using extraction rules (e.g., using field parsing engine 628). Other examples of processing include further augmentation (e.g., using logs enrichment engine 630).

The ingested log messages and metrics data points may be directed to respective log and metrics processing backends that are optimized for processing the respective types of data. However, there are some cases in which information that arrived in the form of a log message would be better processed by the metrics backend than the logs backend. One example of such information is telemetry data, which includes, for example, measurement data that might be recorded by an instrumentation service running on a device. In some embodiments, telemetry data includes a timestamp and a value. The telemetry data represents a process in a system. The value relates to a numerical property of the process in question. For example, a smart thermostat in a house has a temperature sensor that measures the temperature in a room on a periodic basis (e.g., every second). The temperature measurement process therefore creates a timestamp-value pair every second, representing the measured temperature of that second.

Telemetry may be efficiently stored in, and queried-from, a metrics time series store (e.g., using metrics backend 614) than by abusing a generic log message store. By doing so, customers utilizing the data collection and analysis platform 602 can collect host metrics such as CPU usage directly using, for example, a metrics collector. In this case, the collected telemetry is directly fed into the optimized metrics time series store (e.g., provided by metrics processing engine 614). The system can also at the collector level interpret a protocol, such as the common Graphite protocol, and send it directly to the metrics time series storage backend.

As another example, consider a security context, in which syslog messages may come in the form of CSV (comma separated values). However, storing such CSV values as a log would be inefficient, and it should be stored as a time series in order to better query that information. In some example embodiments, although metric data may be received in the form of a CSV text log, the structure of such log messages is automatically detected, and the values from the text of the log (e.g., the numbers between the commas) are stored in a data structure such as columns of a table, which better allows for operations such as aggregations of table values, or other operations applicable to metrics that may not be relevant to log text.

The logs-to-metrics translation engine 632 is configured to translate log messages that include telemetry data into metrics data points. In some embodiments, translation engine 632 is implemented as a service. In some embodiments, upon performing logs to metrics translation, if any of the matched logs-to-metrics rules indicates that the log message (from which the data point was derived) should be dropped, the log message is removed. Otherwise, the logs processing engine is configured to continue to batch log messages into larger batches to persist them (e.g., using persistence engine 634) by sending them to an entity such as Amazon S3 for persistence.

The batched log messages are also sent to log indexer 636 (implemented, for example, as an indexing cluster) for full-text indexing and query update engine 638 (implemented, for example, as a continuous query cluster) for evaluation to update streaming queries.

In some embodiments, once the data points are created in memory, they are committed to persistent storage such that a user can then query the information. In some embodiments, the process of storing data points includes two distinct parts and one asynchronous process. First, based on identifying metadata, the correct time series is identified, and the data point is added to that time series. In some embodiments, the time series identification is performed by time series resolution engine 618 of platform 602. Secondly, a metadata index is updated in order for users to more easily find time series based on metadata. In some embodiments, the updating of the metadata index (also referred to herein as a "metadata catalog") is performed by metadata catalog update engine 640.

Thus, the data collection and analysis platform 602, using the various backends described herein, is able to handle any received machine data in the most native way, regardless of the semantics of the data, where machine data may be represented, stored, and presented back for analysis in the most efficient way. Further, a data collection and analysis system, such as the data collection and analysis platform 602, has the capability of processing both logs and time series metrics, provides the ability to query both types of data (e.g., using query engine 652) and creates displays that combine information from both types of data visually.

The log messages may be clustered by key schema. Structured log data is received (it may have been received directly in structured form, or extracted from a hybrid log, as described above). An appropriate parser consumes the log, and a structured map of keys to values is output. All of the keys in the particular set for the log are captured. In some embodiments, the values are disregarded. Thus, for the one message, only the keys have been parsed out. That set of keys then goes into a schema which may be used to generate a signature and used to group the log messages. That is, the signature for logs in a cluster may be computed based on the unique keys the group of logs in the cluster contains. The log is then matched to a cluster based on the signature identifier. In some embodiments, the signature identifier is a hash of the captured keys. In some embodiments, each cluster that is outputted corresponds to a unique combination of keys. In some embodiments, when determining which cluster to include a log in, the matching of keys is exact, where the key schemas for two logs are either exactly the same or different.

In some embodiments, data point enrichment engine 646 and logs enrichment engine 630 are configured to communicate with metadata collection engine 648 in order to obtain, from a remote entity such as third party service supplier 650, additional data to enrich metrics data points and log messages, respectively.

Figure 7:
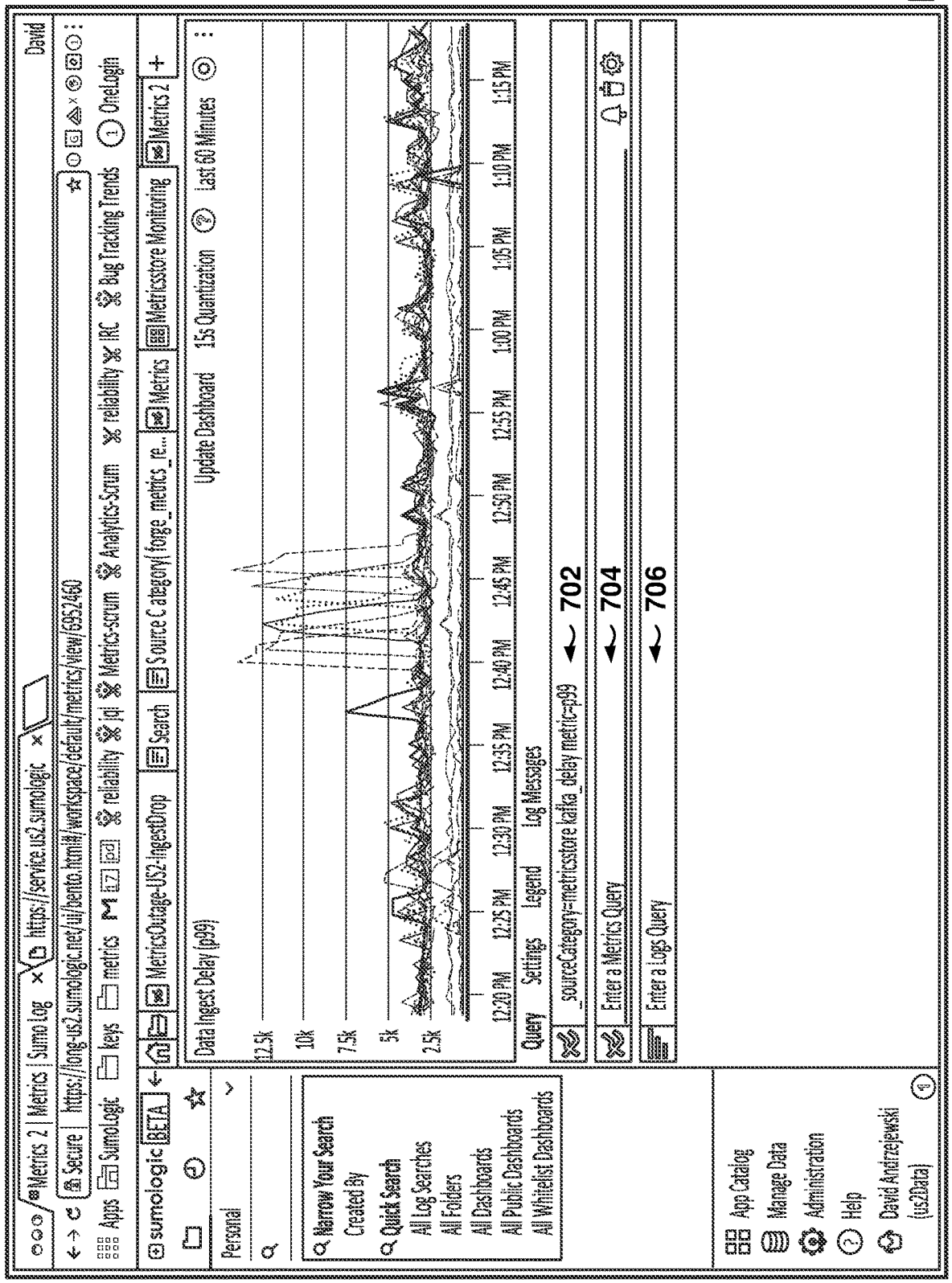
FIG. 7 illustrates an embodiment of an interface for querying time series.

FIG. 7 illustrates an embodiment of an interface for querying time series. In this example, a user has entered a query. As shown in this example, at 702, the user has entered a query 702 for a time series. In this example, the query 702 includes the key values "_sourceCategory=metricsstore" and "kafka_delay metric=p99." Shown also in this dashboard are fields for entering metrics queries 704 and logs queries 706. The user may then enter a logs query 706, and the corresponding logs will be presented, such as the log list presented in FIG. 4.

Figure 8:
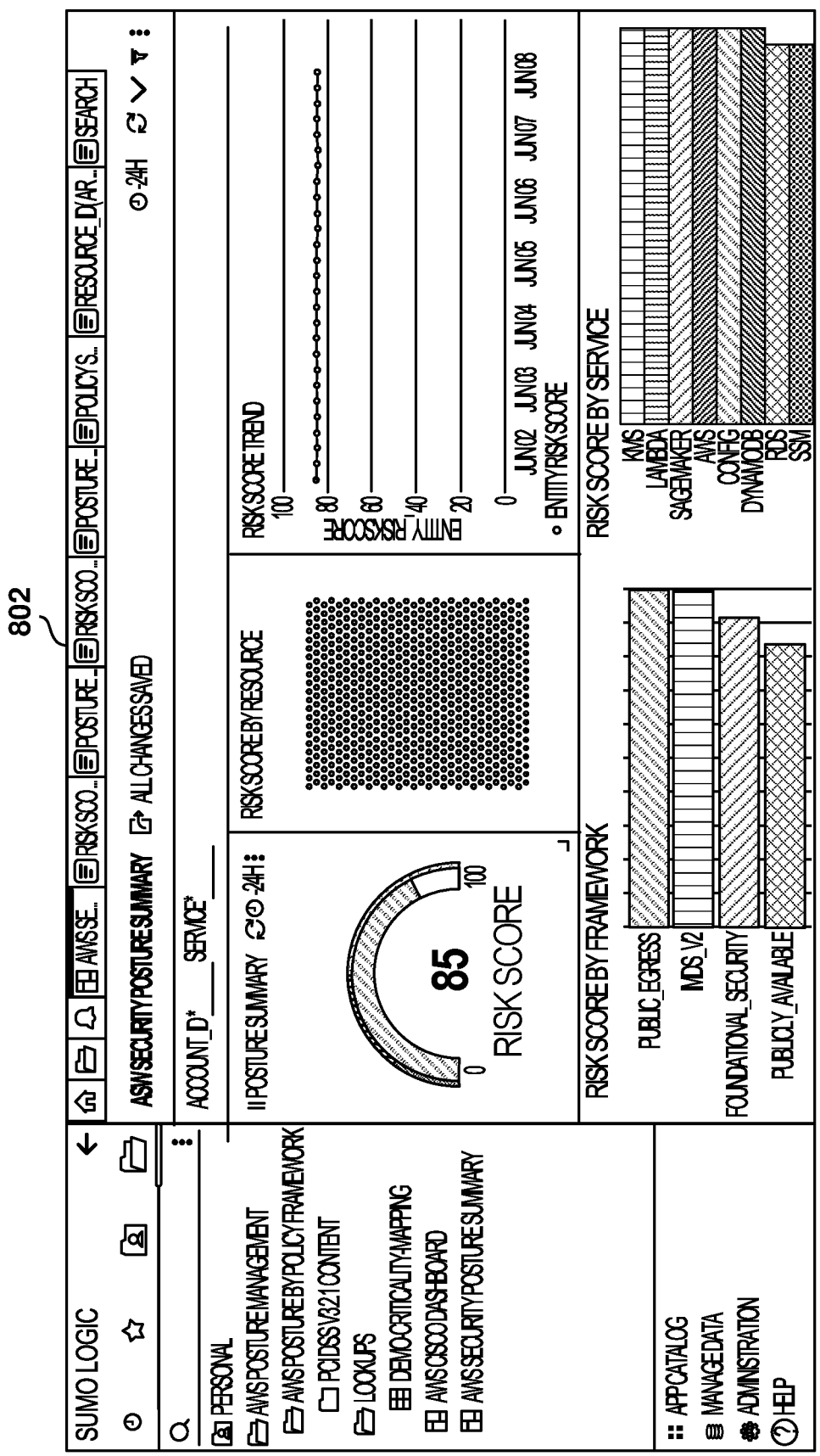
FIG. 8 shows a user-configured dashboard for accessing log information, according to some example embodiments.

FIG. 8 shows a user-configured dashboard 802 for accessing log information, according to some example embodiments. A dashboard is a visual representation of data and data options that assist the user in monitoring and troubleshooting. The dashboards provided by Sumo Logic can be customized to show the metrics and logs that are most important to the user, and the dashboards can be shared with other users.

The Sumo Logic dashboards are built using the Sumo Logic Dashboarding Language (SDL), a declarative language facilitates the creation of complex dashboards without having to write any code. For example, SDL can be used to create charts, tables, filter and drill down into data, and other visualizations. The dashboards make it easy to see trends and patterns in the data to assist in identifying problems and opportunities. Also, the dashboards can help to monitor the user applications and track metrics such as CPU usage, memory usage, and latency.

When users create dashboards, the users may name different scripts, queries, or functions with useful names (e.g., show memory usage, show top nodes in CPU utilization), and these names can be used for autocomplete purposes as well as to identify search queries that may be useful during troubleshooting.

As users write queries, they often choose to save the most useful queries for later use. The system provides various features that enable users to organize their saved content, such as folders and sharing settings. Through regular use of the product, engaged users will accumulate a substantial library of saved searches, dashboards, alerts, and similar content. This library of saved content provides valuable insights into the types of data analysis and information that users deem important, as evidenced by the fact that users take care to conduct the analysis and save it for future reference. The richness of this dataset reflects users' priorities and interests with regard to data analysis, and can be used to prioritize search results and autocomplete suggestions.

Figure 9:
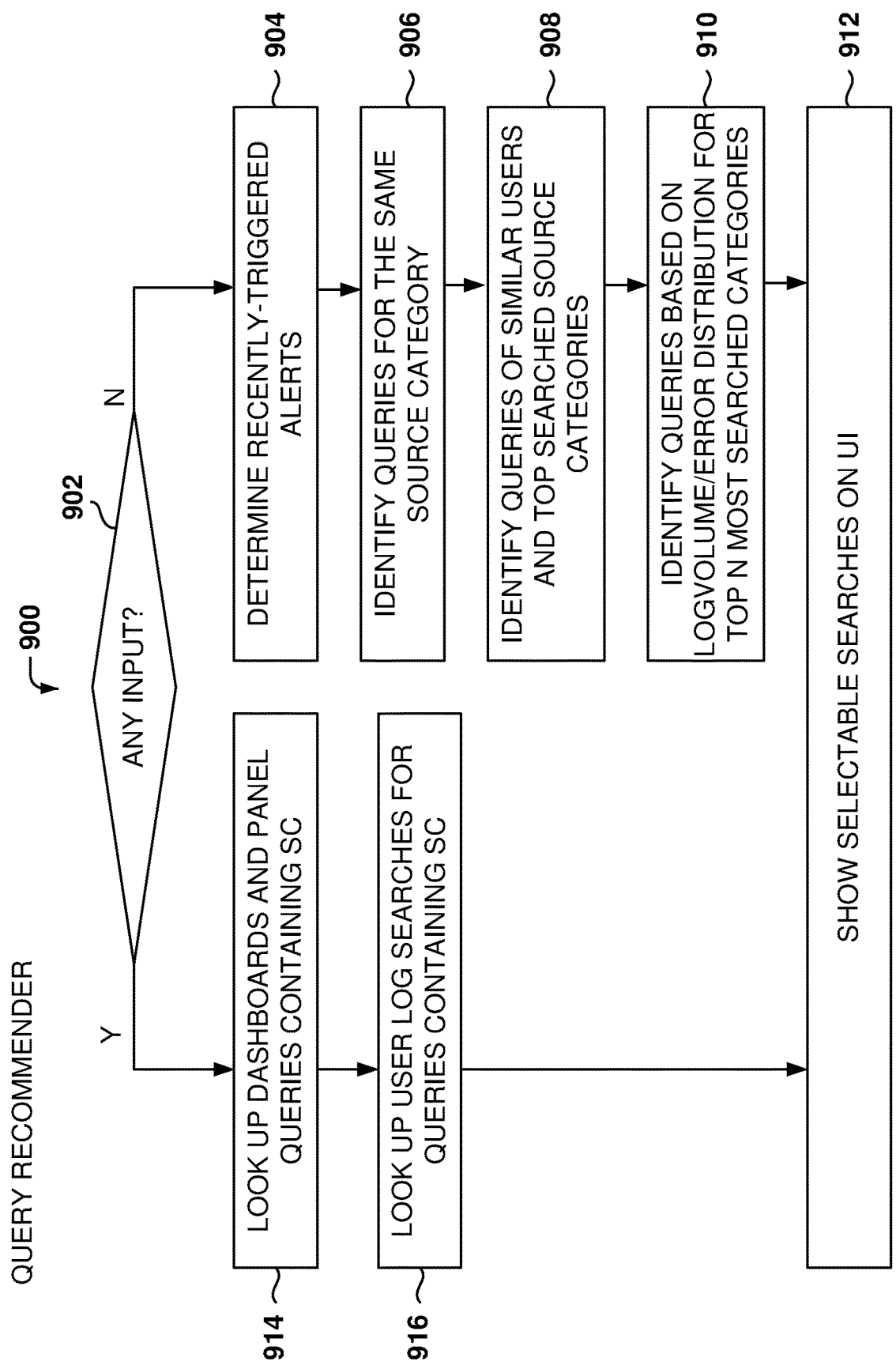
FIG. 9 is a flowchart of a method for generating query recommendations, according to some example embodiments.

FIG. 9 is a flowchart of a method 900 for generating query recommendations, according to some example embodiments. While the various operations in this flowchart are presented and described sequentially, one of ordinary skill will appreciate that some or all of the operations may be executed in a different order, be combined or omitted, or be executed in parallel.

The present embodiments utilize various data sources to provide personalized recommendations to users. One data source is the prior log-search queries conducted by individual users within the system (e.g., the user ID, the query, and a label). Another data source is the status of any alerts configured by the user's organization that are currently active (e.g., alert status, alert description, and alert query).

Additionally, some embodiments leverage the knowledge of all dashboards and panels configured by users (e.g., dashboard title, panel title, and queries associated with the panels). Dashboard viewing statistics at the individual user level also inform the recommendations (e.g., dashboard ID, statistics on the dashboard ID, such as count of number of times used). That is, the system comprehensively instruments and logs all interactions users have with the system and uses this information to select the most relevant data.

Furthermore, the system considers not just individual users in isolation, but also their peers within the same tenant organization. For example, if Acme Corp is a customer, and there is historical interaction data for both Alice and Bob, who both work at Acme, then the user data and the peer data for a tenant organization will factor into the generated recommendations.

At operation 902, a check is made to determine if the user has entered any input in the search field (e.g., search field 104 in FIG. 1). If no input has been received, it means that this is the initial state of the search and the search for query suggestions continues to operation 904 to determine the recently-triggered alerts within a predetermined time period (e.g., last five minutes, last hour, today, last 12 hours, last 24 hours, etc.).

For example, if a billing server has active alerts, then the system will automatically recommend natural language queries related to the logs for the billing server (e.g., "Show me the logs for the billing server").

From operation 904, the method 900 flows to operation 906 to identify previously-entered queries that search for logs of the same source category as the triggered alerts (e.g., search for logs with_sourceCategory equal to the source category of one triggered alert identified in operation 904).

A source category is a free-form metadata tag that can be used to categorize data sources. The source category is stored as metadata with the stored log information. The source categories can be used to define the scope of searches, index and partition data, and control who sees what data. In some example embodiments, the source category is stored in a field called_sourceCategory, that can be used to filter searches, index the data, and control access to the data. For example, a source category may be defined as "Billing" and will be used for billing-related resources (e.g., servers, reports, billing software). In another example, the source category may be called Prod Web Apache Access to categorize the Apache web server access logs. This source category can then be used to filter searches to include Apache web server access logs. The source categories can also be used to index data, which creates a searchable database of related logs.

The system can provide personalized recommendations using metadata fields such as source categories because customers tend to organize and categorize their data using source categories. Therefore, source category serves as an important metadata field for the analysis.

Given suspected source categories of interest, the system can provide various recommendations, such as displaying the logs or log counts for that source category, looking up dashboards or saved searches containing the same source category, etc. In this way, source category is leveraged as pivotal metadata to infer user interest.

The system can also auto-suggest previously saved content associated with the source category of interest, which helps surface analyses that may be unknown to the user, but relevant given the shared source category. For example, a colleague may have authored a valuable query on billing data that the user is unaware of. Connecting users interested in the same source categories enables discovery.

Source categories provide a useful pivot point for recommendations since users have invested effort curating them. However, other metadata could also be used to compartmentalize and categorize data for recommendations. The key is utilizing metadata to infer user interest areas from large volumes of data, and provide personalized suggestions based on those interests.

From operation 906, the method 900 flows to operation 908 to identify queries based on the searches of similar users and their top-searched source categories. For example, the recent search queries of similar users are identified and the source categories in those searches are selected to provide suggested searches for logs in those search categories.

The system leverages social network analysis to provide personalized recommendations. For example, the system determines the source categories that a given user, such as Alice, frequently accesses, and then identifies other users who look at similar source categories as Alice. Based on the premise that users accessing the same categories likely have analogous roles or interests, the system recommends additional relevant source categories or saved queries from these similar users to Alice.

For example, if Bob often views the same source categories as Alice, the system will recommend to Alice source categories, past analyses, or queries authored by Bob, as these are likely to also be relevant to Alice. Users can save queries in the system by giving them meaningful names that describe the analysis, such as "Failing Payment Plans." The system can recommend saved queries to Alice based on their descriptive names and the fact that the queries were created by users with similar data source access patterns as Alice. In summary, by leveraging social network connections based on shared data source usage, the system provides personalized recommendations of supplemental source categories, analyses, and queries to the users.

From operation 908, the method 900 flows to operation 910 to identify search queries that search for logs related to a predetermined number of the top most-searched source categories (e.g., the top 10 most-searched source categories).

The system can provide recommendations based on domain knowledge to display volumes or error counts for the most common data sources. For example, the system may show the number of logs from the billing server over time, or the number of errors from the billing server in the past hour, or per hour, over the past day. This leverages knowledge of data sources frequently accessed by users to provide analysis, e.g., overall log or error counts. The recommendations can be personalized or global. Personalized recommendations would analyze the specific source categories an individual user often searches and provide counts for those. Global recommendations would look at the most searched source categories across the entire organization and display the predefined analyses of interest or error counts for those popular categories. In summary, by leveraging domain knowledge of commonly accessed data sources, whether personalized or organization-wide, the system can recommend relevant log and error count analyses to users.

From operation 910, the method 900 flows to operation 912 where the identified search queries are presented in the UI. When there is user input, the method 900 flows from operation 902 to operation 914 for looking up dashboards and panel queries containing the source category of the triggered alert or alerts.

The system can provide query suggestions as the user starts to write a query. For example, the system can recommend relevant dashboards or panels by recommending those most frequently visited by the individual user, suggesting those often visited by similar peers, and proposing globally popular dashboards for all the users in the same company.

The system pre-generates candidate queries the user can simply click/select rather than type. These are presented as clickable buttons that when clicked, they become queries.

Further, query autocompletion and suggested queries leverage recommendation techniques. The system analyzes usage patterns to recommend individualized queries based on the user's own activity, peer activity, and overall tenant activity. By pre-generating statistically derived query recommendations, the system provides a frictionless method for users to construct queries without typing.

From operation 914, the method 900 flows to operation 916 for looking up user log searches for queries containing the source category. Further, from operation 916, the method 900 flows to operation 912. At this point, the system has generated multiple candidate analyses and queries to recommend to the user. However, more options may be generated than can reasonably be displayed. Therefore, the system ranks and selects a subset of recommended queries to present to the user.

For example, at the start, with no user-specific information, generic popularity ranking may be used to select the top candidates. As the user starts to type or click suggested chips, the system re-calculates recommendations based on the new interaction data. In some example embodiments, a machine-learning (ML) model can leverage past query presentations and user responses to rank the query suggestions and then select the highest-ranked query suggestions for presentation. The ML model considers what queries users tended to click on previously given similar interaction context.

As the user continues to engage, the system accumulates more input data to refine the model's rankings. The model incorporates environmental signals and evolves to optimize suggestion relevance based on observed user behaviors. In this way, the system iteratively improves query recommendations as more user data becomes available during the search session. One goal is to select and rank the most useful queries to display to the user as the interaction progresses.

Figure 10:
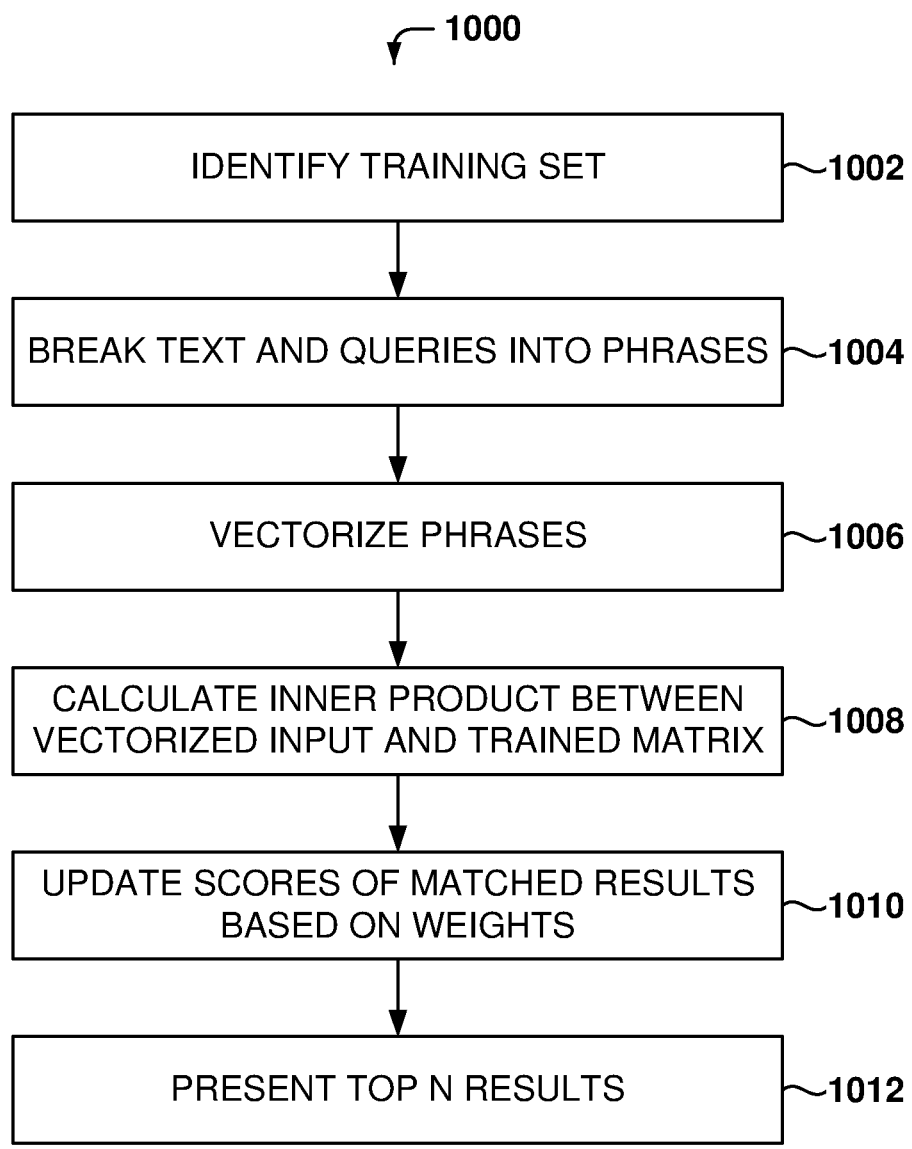
FIG. 10 is a flowchart of a method for generating autocomplete options, according to some example embodiments.

FIG. 10 is a flowchart of a method 1000 for generating autocomplete options, according to some example embodiments. While the various operations in this flowchart are presented and described sequentially, one of ordinary skill will appreciate that some or all of the operations may be executed in a different order, be combined or omitted, or be executed in parallel.

The system leverages natural language processing for auto-completion and suggestions, and analyzes the corpus of past user queries, dashboard names, alert names, and other content. Customers provide natural language names and descriptions for dashboards, panels, and other artifacts that encapsulate the meaning of the underlying queries.

The autocomplete and natural language processing capabilities allow the system to understand previous queries, dashboards, and alerts created by the users. When a customer generates a dashboard within the product interface, the customer assigns a descriptive name, and this description name may be leveraged to understand the purpose of the query. For example, dashboard panels may be named "Web Traffic Overview," "Number of Requests," "Billing traffic," etc.

This provides a labeled dataset connecting queries and analyses with human-authored descriptive text. The system uses this dataset to train natural language models. Given a user's text input, these models can suggest relevant queries that match the semantic meaning. For example, if a user starts typing "web traffic overview," the system can autocomplete or recommend related queries on web traffic data based on learning the association between those keywords and queries from past dashboard names. For example, if the user types "show me web," an autocomplete suggestion may be "show me web traffic overview" because this query exists in one of the user panels.

Operation 1002 is for identifying a training set, as discussed above. The training set includes one or more of the prior log-search queries conducted by individual users within the system, the status of any alerts configured by the user's organization that are currently active is another data source, the information for dashboards and panels configured by users, or dashboard viewing statistics at the individual user level.

Some systems, like Sumo Logic, have a large number of queries. Also, apps may be installed that performed certain functions. Even though a user may not have installed some apps, the system could show relevant auto-complete suggestions based on that large library of app-related queries. For example, even though a custom internal dashboard for a unique in-house billing service may not be publicly available, if a coworker created one and named it showing the purpose of the underlying query, the system could still map the user input to suggest that dashboard, even if the user is unaware of its existence.

From operation 1002, the method 1000 flows to operation 1004 where the training data is preprocessed to break text and queries into meaningful phrases. The preprocessing may include the following:

Split the sentences based on special symbols, such as a colon, "\n" (paragraph mark or new-line mark), "|", "//", a comma, an open-parenthesis symbol, a close-parenthesis symbol, a space, or "\\".

Replace some characters, such as "_" with nothing (e.g., deleting underscores), replacing "-" with a space, replacing "!=" with "is not", replacing "=" with "is", and replacing "\" with a comma.

Count the number of words in each phrase.

Count the occurrence of each phrase.

Remove duplicate phrases.

From operation 1004, the method 1000 flows to operation 1006 where the phrases are vectorized. In some example embodiments, the phrases are vectorized using the tool TfidfVectorizer, but other tools may also be used. The result is a matrix of TF-IDF features. The results are vector embeddings for the phrases. Another example of a vectorizer is Word2Vec.

TF-IDF (Term Frequency-Inverse Document Frequency) is a statistical measure that is used to quantify the importance of a word in a document within a collection of documents. The TF-IDF value is calculated by multiplying two metrics: the Term Frequency (TF), which is the number of times a word appears in a document, and the Inverse Document Frequency (IDF), which is a measure of how common a word is in a collection of documents. The TF-IDF value is higher for words that appear frequently in a document but are not common in the collection of documents. This means that the words that are most likely to be relevant to a document will have high TF-IDF values.

From operation 1006, the method 1000 flows to operation 1008 to calculate the inner product between the vectorized user input and the trained matrix of features using linear kernel in order to find phrases from the training set that are similar to the user input.

From operation 1008, the method 1000 flows to operation 1010 to update the scores of matched results by multiplying the scores by their weights (e.g., Euclidean norm of the count vector). A predetermined number of the top matched results are selected for presentation to the user.

From operation 1010, the method 1000 flows to operation 1012 where the output phrases are mapped to the query and presented on the UI.

Figure 11:
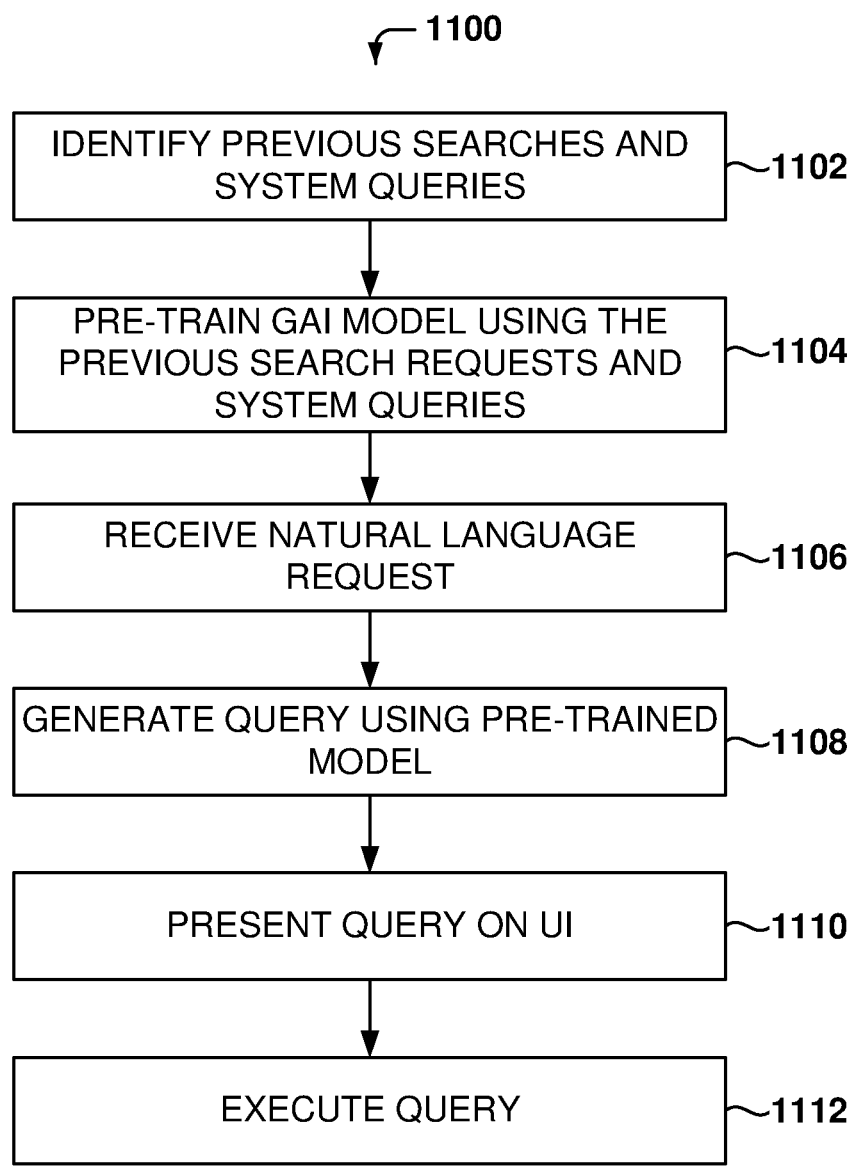
FIG. 11 is a flowchart of a method for converting natural language request into a search query, according to some example embodiments.

FIG. 11 is a flowchart of a method 1100 for converting natural language request into a search query, according to some example embodiments. While the various operations in this flowchart are presented and described sequentially, one of ordinary skill will appreciate that some or all of the operations may be executed in a different order, be combined or omitted, or be executed in parallel.

Operation 1102 is for identifying previous searches and queries, including those configured in user panels. From operation 1102, the method 1100 flows to operation 1104 to pre-train a T5 transformer model. The T5 model is pre-trained on the previous search request and system queries.

T5, or Text-to-Text Transfer Transformer, is a transformer model, which means that it is based on the transformer architecture, which is a neural network architecture that is particularly well-suited for natural language processing tasks. T5 is a unified text-to-text model, which means that it can be used for a variety of text-to-text tasks, such as text summarization to summarize a long piece of text into a shorter, more concise version, question answering to answer questions about a given piece of text, and text generation to generate new text, such as poems, code, scripts, musical pieces, email, letters, etc. T5 was pre-trained on a massive dataset of text and code, and it can be fine-tuned for specific tasks.

Below are a few examples of prompts used for fine tuning the T5 model.

("Show me count of top 10 source categories", "_sourceCategory=* I count by_sourceCategory I top 10 _sourceCategory by _count"),
("get logs for analytics containing text \" signature library\" ", "_sourceCategory=analytics \"signature library \" "),
("find the top 10 most active users", "_sourceCategory=*|parse \ "user=*\" as user|count by user|top 10 user by _count"),
("all log messages containing the text \"error\ " ", "_sourceCategory=* \ "error\ " "),
("find the average response time for a specific endpoint ","_sourceCategory=myapp/access|parse \ "method=* endpoint=* duration=*\"
("find log messages where host is light-ingest and log level is error", "sourcecategory=* host=light-ingest AND level=ERROR"),
("find log messages with an error and count the results by source host and source category", "sourceCategory=* \"error\ " | count by
("find the top 10 error logs by count", "_sourceCategory=* \ "error\ " | count by message | sort by _count desc | limit 10"),
("sorts the logs by the \ "count\" field in descending order", "_sourceCategory=* | count as count by host | sort count desc"),
("groups log messages by the \ "host \" field", "_sourceCategory=* | group by host"),
("count the number of log messages in each time slice", "_sourcecategory=* | timeslice 1 h | count as count by _timeslice"),
("show me log messages for kattaException", "_sourceCategory=* \ "kattaException \" "},
("show me logs for stream ", "_sourceCategory=* \"stream\ " "), ("count errors in stream by sourceHost and display the top 10", "_sourceCategory=stream error | count by sourceHost | top 10 source
("display top 10 logs in stream ", "_sourcecategory=stream | count by _sourceHost | top 10 _sourceHost by _count"),
("show me logs", "_sourceCategory=*"),
("show me logs for analytics", "_sourceCategory=\ "analytics \""),
("show me logs for stream where callerModule is report", "_sourceCategory=\"stream\" callerModule=\ "report \" "),
("show me logs for service where sourceHost is light-ingest", "_sourceCategory=\"service\" callerModule=\ "light-ingest\" ")

Some of the operations used for the training include one or more of the following:

Tokenize the input and output; get data_id and attention masks. The target values are prepended with a label explaining the intent of translation.
Feed the above into the forward function and generate a Seq2SeqModelOutput.
Evaluate the cross-entropy loss between predictions and labels.
Do a backward pass to update the weights and bias.
Update the weights and correct the gradient bias. Used optimizer that applies weight decay to all hyperparameters except bias and layer normalization terms.

This process may be repeated for a number of epochs (e.g., 10 epochs, but other values may also be used). Here is an example of hyperparameters used:

```
t5_model.generate (
    input_ids=test_input_ids,
    attention_mask=test_attention_mask,
    max length=64,
    early_stopping=True,
    num_beams=15,
    num_return_sequences=3,
    no_repeat_ngram_size=2
)
```

From operation 1104, the method 1100 flows to operation 1106, where a natural-language request (e.g., search query) is received.

From operation 1106, the method 1100 flows to operation 1108 where one or more queries are generated using the pre-trained model. In some example embodiments, the input for the model is the natural language request entered by the user, and the output of the model is one or more query suggestions.

From operation 1108, the method 1100 flows to operation 1110 where the one or more queries identified by the model are presented on the UI.

From operation 1110, the method 1100 flows to operation 1112, where, after receiving a request from the user, one of the suggested queries is executed.

Figure 12:
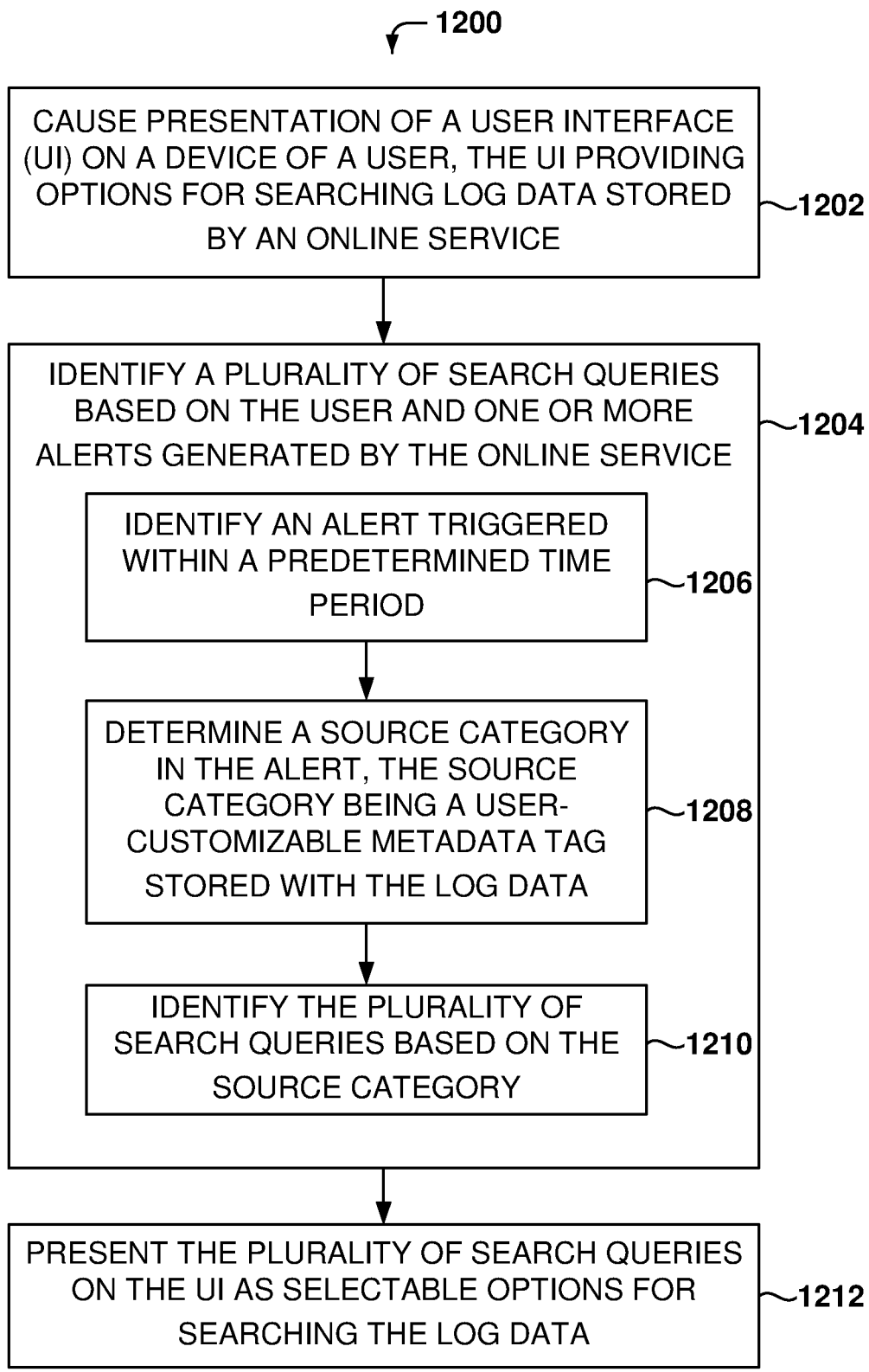
FIG. 12 is a flowchart of a method for recommending one or more queries to search log information, according to some example embodiments.

FIG. 12 is a flowchart of a method 1200 for generating query recommendations, according to some example embodiments. While the various operations in this flowchart are presented and described sequentially, one of ordinary skill will appreciate that some or all of the operations may be executed in a different order, be combined or omitted, or be executed in parallel.

Operation 1202 is for causing presentation of a UI on a device of a user, the UI providing options for searching log data stored by an online service.

From operation 1202, the method 1200 flows to operation 1204 to identify a plurality of search queries based on the user and one or more alerts generated by the online service. Operation 1204 comprises operations 1206, 1208, and 1210.

Operation 1206 is for identifying an alert triggered within a predetermined time period.

From operation 1206, the method 1200 flows to operation 1208 for determining a source category in the alert, the source category being a user-customizable metadata tag stored with the log data.

From operation 1208, the method 1200 flows to operation 1210 for identifying the plurality of search queries based on the source category.

From operation 1204, the method 1200 flows to operation 1212 to present the plurality of search queries on the UI as selectable options for searching the log data.

In view of the disclosure above, various examples are set forth below. It should be noted that one or more features of an example, taken in isolation or combination, should be considered within the disclosure of this application.

In one example, identifying the plurality of search queries based on the source category further comprises identifying previously-entered search queries on the online service that search for logs having the source category as metadata.

In one example, identifying the plurality of search queries based on the source category further comprises determining additional source categories used by other users of the online service, and identifying previously-entered search queries on the online service that search for logs having any of the additional source categories as metadata.

In one example, identifying the plurality of search queries based on the source category further comprises determining most searched source categories across users of a same organization, and identifying search queries associated with the most searched source categories.

In one example, the method 1200 further comprises detecting search text input entered via the UI: identifying a new plurality of search queries based on the search text input, the user, and the one or more alerts generated by the online service; and presenting the new plurality of search queries on the UI as selectable options for searching the log data.

In one example, identifying a new plurality of search queries further comprises identifying query suggestions based on queries associated with customizable panels of dashboards created by users of the online service.

In one example, identifying a new plurality of search queries further comprises identifying search queries received by the online service that contain a search for the source category.

In one example, the method 1200 further comprises detecting a selection in the UI of a search query from the plurality of search queries, and executing the selected search query.

Another general aspect is for a system that includes a memory comprising instructions and one or more computer processors. The instructions, when executed by the one or more computer processors, cause the one or more computer processors to perform operations comprising: causing presentation of a user interface (UI) on a device of a user, the UI providing options for searching log data stored by an online service: identifying a plurality of search queries based on the user and one or more alerts generated by the online service, wherein identifying the plurality of search queries comprises: identifying an alert triggered within a predetermined time period: determining a source category in the alert, the source category being a user-customizable metadata tag stored with the log data; and identifying the plurality of search queries based on the source category; and presenting the plurality of search queries on the UI as selectable options for searching the log data.

In yet another general aspect, a non-transitory machine-readable storage medium (e.g., a non-transitory storage medium) includes instructions that, when executed by a machine, cause the machine to perform operations comprising: causing presentation of a user interface (UI) on a device of a user, the UI providing options for searching log data stored by an online service: identifying a plurality of search queries based on the user and one or more alerts generated by the online service, wherein identifying the plurality of search queries comprises: identifying an alert triggered within a predetermined time period: determining a source category in the alert, the source category being a user-customizable metadata tag stored with the log data; and identifying the plurality of search queries based on the source category; and presenting the plurality of search queries on the UI as selectable options for searching the log data.

Figure 13:
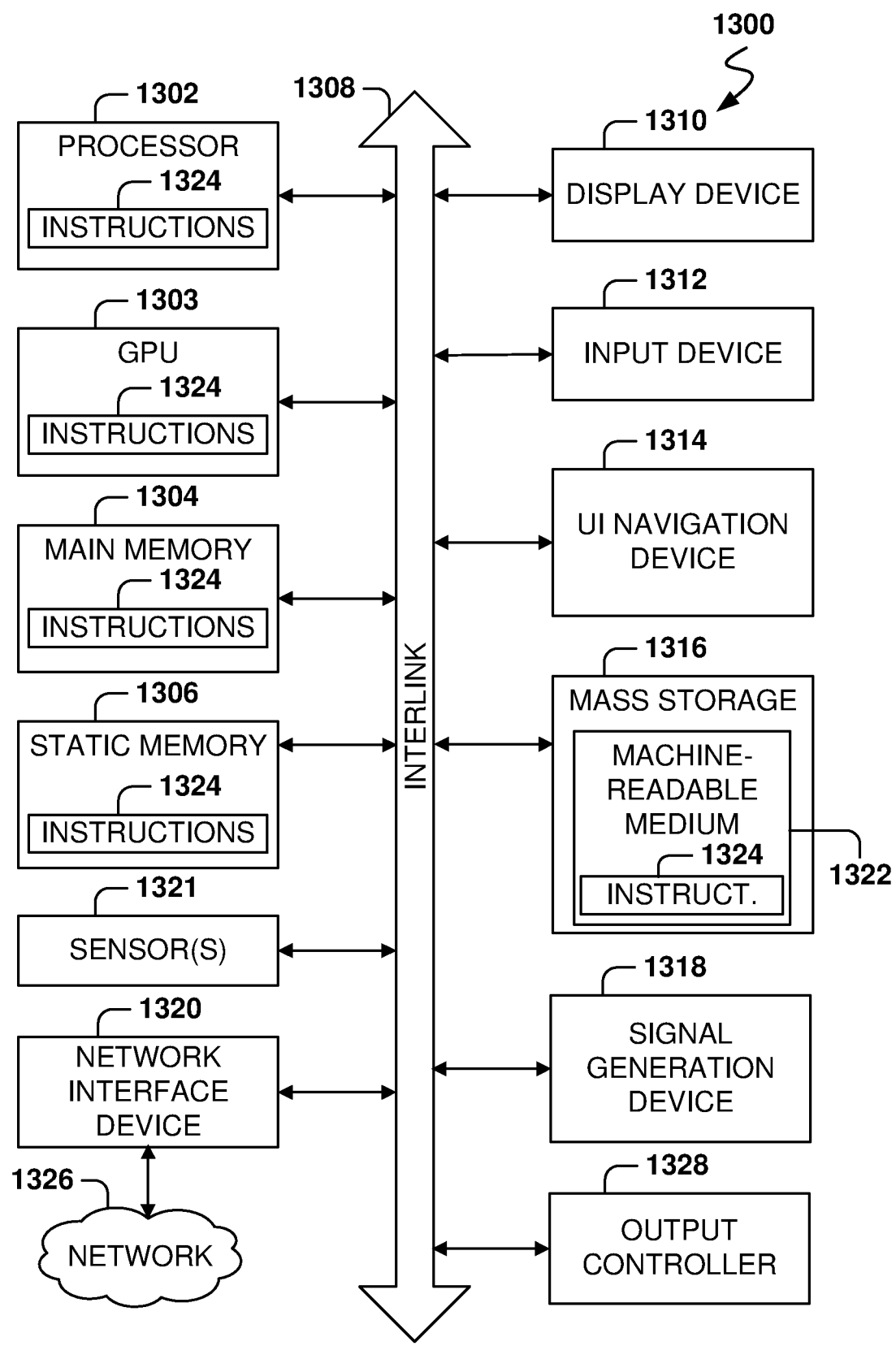
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine 1300 (e.g., computer system) may include a hardware processor 1302 (e.g., a central processing unit (CPU), a hardware processor core, or any combination thereof), a graphics processing unit (GPU 1303), a main memory 1304, and a static memory 1306, some or all of which may communicate with each other via an interlink 1308 (e.g., bus). The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device 1316 (e.g., drive unit), a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    causing presentation of a user interface (UI) on a device of a user, the UI providing options for searching log data stored by an online service;
    identifying a plurality of search queries based on the user and one or more alerts generated by the online service based on the log data received by the online service, wherein identifying the plurality of search queries comprises:
        identifying an alert triggered by the online service within a predetermined time period;
        determining a source category associated with the alert triggered by the online service, the source category being a user-customizable metadata tag to identify a source of data;
        identifying previously-entered queries to search for logs with the determined source category as metadata; and
        identifying the plurality of search queries based on the previously-entered queries for the source category; and
    presenting the plurality of search queries on the UI as selectable options for searching the log data.

2. The method as recited in claim 1, wherein identifying the plurality of search queries based on the source category further comprises:
    determining additional source categories used by other users of the online service; and
    identifying previously-entered search queries on the online service that search for logs having any of the additional source categories as metadata.

3. The method as recited in claim 1, wherein identifying the plurality of search queries based on the source category further comprises:
    determining most searched source categories across users of a same organization; and
    identifying search queries associated with the most searched source categories.

4. The method as recited in claim 1, further comprising:
    detecting search text input entered via the UI;
    identifying a new plurality of search queries based on the search text input, the user, and the one or more alerts generated by the online service; and
    presenting the new plurality of search queries on the UI as selectable options for searching the log data.

5. The method as recited in claim 4, wherein identifying a new plurality of search queries further comprises:
identifying query suggestions based on queries associated with customizable panels of dashboards created by users of the online service.

6. The method as recited in claim 4, wherein identifying a new plurality of search queries further comprises:
identifying search queries received by the online service that contain a search for the source category.

7. The method as recited in claim 1, further comprising:
detecting a selection in the UI of a search query from the plurality of search queries; and
executing the selected search query.

8. A system comprising:
a memory comprising instructions; and
one or more computer processors, wherein the instructions, when executed by the one or more computer processors, cause the system to perform operations comprising:
causing presentation of a user interface (UI) on a device of a user, the UI providing options for searching log data stored by an online service;
identifying a plurality of search queries based on the user and one or more alerts generated by the online service based on the log data received by the online service, wherein identifying the plurality of search queries comprises:
identifying an alert triggered by the online service within a predetermined time period:
determining a source category associated with the alert triggered by the online service, the source category being a user-customizable metadata tag to identify a source of data;
identifying previously-entered queries to search for logs with the determined source category as metadata; and
identifying the plurality of search queries based on the previously-entered queries for the source category; and
presenting the plurality of search queries on the UI as selectable options for searching the log data.

9. The system as recited in claim 8, wherein identifying the plurality of search queries based on the source category further comprises:
determining additional source categories used by other users of the online service; and
identifying previously-entered search queries on the online service that search for logs having any of the additional source categories as metadata.

10. The system as recited in claim 8, wherein identifying the plurality of search queries based on the source category further comprises:
determining most searched source categories across users of a same organization; and
identifying search queries associated with the most searched source categories.

11. The system as recited in claim 8, wherein the instructions further cause the one or more computer processors to perform operations comprising:
detecting search text input entered via the UI;
identifying a new plurality of search queries based on the search text input, the user, and the one or more alerts generated by the online service; and
presenting the new plurality of search queries on the UI as selectable options for searching the log data.

12. The system as recited in claim 11, wherein identifying a new plurality of search queries further comprises:
identifying query suggestions based on queries associated with customizable panels of dashboards created by users of the online service.

13. The system as recited in claim 11, wherein identifying a new plurality of search queries further comprises:
identifying search queries received by the online service that contain a search for the source category.

14. A non-transitory machine-readable storage medium including instructions that, when executed by a machine, cause the machine to perform operations comprising:
causing presentation of a user interface (UI) on a device of a user, the UI providing options for searching log data stored by an online service;
identifying a plurality of search queries based on the user and one or more alerts generated by the online service based on the log data received by the online service, wherein identifying the plurality of search queries comprises:
identifying an alert triggered by the online service within a predetermined time period;
determining a source category associated with the alert triggered by the online service, the source category being a user-customizable metadata tag to identify a source of data;
identifying previously-entered queries to search for logs with the determined source category as metadata; and
identifying the plurality of search queries based on the previously-entered queries for the source category; and
presenting the plurality of search queries on the UI as selectable options for searching the log data.

15. The non-transitory machine-readable storage medium as recited in claim 14, wherein identifying the plurality of search queries based on the source category further comprises:
determining additional source categories used by other users of the online service; and
identifying previously-entered search queries on the online service that search for logs having any of the additional source categories as metadata.

16. The non-transitory machine-readable storage medium as recited in claim 14, wherein identifying the plurality of search queries based on the source category further comprises:
determining most searched source categories across users of a same organization; and
identifying search queries associated with the most searched source categories.

17. The non-transitory machine-readable storage medium as recited in claim 14, wherein the machine further performs operations comprising:
detecting search text input entered via the UI;
identifying a new plurality of search queries based on the search text input, the user, and the one or more alerts generated by the online service; and
presenting the new plurality of search queries on the UI as selectable options for searching the log data.

* * * * *